(12) United States Patent  (10) Patent No.: US 7,210,883 B2
Smith  (45) Date of Patent: May 1, 2007

(54) TIE DOWN ANCHOR

(76) Inventor: Karl Smith, 201 N. Ocean Blvd. #308, Pompano Beach, FL (US) 33062

( * ) Notice: Subject to any disclaimer, the term of this patent is extended or adjusted under 35 U.S.C. 154(b) by 0 days.

(21) Appl. No.: 10/840,411

(22) Filed: May 5, 2004

(65) Prior Publication Data
US 2005/0249569 A1 Nov. 10, 2005

(51) Int. Cl.
B60P 7/08 (2006.01)
(52) U.S. Cl. .................. 410/106; 410/101; 410/102
(58) Field of Classification Search ............... 410/101, 410/102, 106, 110, 116; 24/115 K, 129 R, 24/129 B, 265 CD; 224/489, 534, 568; 248/499
See application file for complete search history.

(56) References Cited
U.S. PATENT DOCUMENTS

| | | | |
|---|---|---|---|
| 3,722,911 A | 3/1973 | Rhody | |
| 4,288,188 A | 9/1981 | Smith | |
| 5,052,869 A | 10/1991 | Hansen, II | |
| 6,065,917 A | 5/2000 | Shambeau et al. | |
| 6,113,328 A | * | 9/2000 | Claucherty .................. 410/106 |
| 6,142,718 A | 11/2000 | Kroll | |
| 6,350,089 B1 | * | 2/2002 | Tekavec ..................... 410/106 |
| 6,848,873 B1 | * | 2/2005 | Husk .......................... 410/115 |
| 6,918,721 B2 | * | 7/2005 | Venton-Walters et al. .. 410/102 |

* cited by examiner

Primary Examiner—Stephen Gordon
(74) Attorney, Agent, or Firm—David W. Barman; Robert M. Schwartz

(57) ABSTRACT

The present invention is a novel tie down anchor formed of a single piece and a method of using the single piece tie down anchor.

4 Claims, 3 Drawing Sheets

TIE DOWN ANCHOR

FIELD OF THE INVENTION

The present invention relates to an improved anchor to be used with a tie down and a method of using said anchor.

BACKGROUND OF THE INVENTION

Inevitably, no matter what size vehicle one is driving; there is invariably a need to transport an article that does not fit inside the vehicle. A common practice is to place an oversized article on the roof of the vehicle and to secure the article by means of a tie down. The difficulty arises in that there is not a convenient place to secure the tie down. There have been numerous attempts to fill this need. U.S. Pat. No. 3,722,911 describes a tie down anchor to be secured under the bumper of a vehicle. This invention secures to the bumper of a vehicle and comprises numerous manufactured parts, including a support plate, fastening means to attach to a bumper, spacer, and a movable anchor. U.S. Pat. No. 4,288,188 describes an anchor for a tie down comprising a plurality of manufactured parts including a flexible strand, ferrule and plastic cover. This invention is described as being used in the hood and trunk wit the strand extending from the vehicle to receive the tie down. Other patents describing tie down anchors include U.S. Pat. Nos. 5,052,869; 6,065,917; and 6,142,718. While all of these inventions have individual merit, they fail to address the concern of the present invention. The present invention improves upon past attempts to create an effective tie down anchor by providing an article that is manufactured of one rigid piece.

SUMMARY OF THE INVENTION

The subject invention provides an improved, single piece tie down anchor and a method of using said anchor.

A tie down anchor comprising:
a. a single, rigid, manufactured piece
b. curved portion for receiving a tie down The tie down anchor of subject invention is a single, rigid, manufactured piece made of metal or plastic and exhibiting a tensile strength of at least 400 pounds.

The tie down anchor further comprises a ferrule forming a bore for receiving an anchoring screw.

In one embodiment, the tie down anchor of further comprises a threaded portion incorporated into the body of said anchor for direct anchoring to a surface without the need of a separate securing screw.

The present also include a method for anchoring a tie down to a motor vehicle comprising:
a. removing the anchor screws from a license tag;
b. placing a tie down anchor adjacent to the position from where said anchor screws from a license tag has been removed;
c. replacing the anchor screws from a license tag by passing them through a tie down anchor;
d. securing the tie down anchor and the license tag contemporaneously through the application of the anchor screws from a license tag into the outer surface of a motor vehicle;
e. threading a tie down through a curved portion in the tie down anchor The present invention is advantageous over most tie down anchors and methods in that it does not obstruct the view of the license tag. This is important because in most states, it is illegal to drive with the license tag obstructed.

The method may include a tie down anchor as a single piece secured to each of two anchor screws from a license tag. In many situations, there is no convenient or acceptable location near the rear of the vehicle in which to secure a tie down. The present invention successfully addresses this situation by securing to the one feature present on all vehicles, a license tag. The tie down of the present invention is also advantageous because the proximity of the license tag to the trunk provides that the tie down can also secure into position a trunk that is not locked into the closed position. In an alternative embodiment, the method comprises two tie down anchors, each independently secured through the anchor screws from a license tag contemporaneously securing the tie down anchor and the license tag.

DETAILED DESCRIPTION OF THE PREFERRED EMBODIMENT

The tie down anchor of the present invention is formed of a single manufactured piece. In forming the anchor of a single piece, the subject invention provides a novel improvement over other tie down anchors. The tie down anchor of the present invention will be easier to manufacture and can be formed of suitable size and composition to provide the strength needed in such an anchor. It will readily apparent to one well skilled in the art, that it be desirable for the tie down anchor to exhibit a tensile strength of up to 400 pounds.

Figure 1:
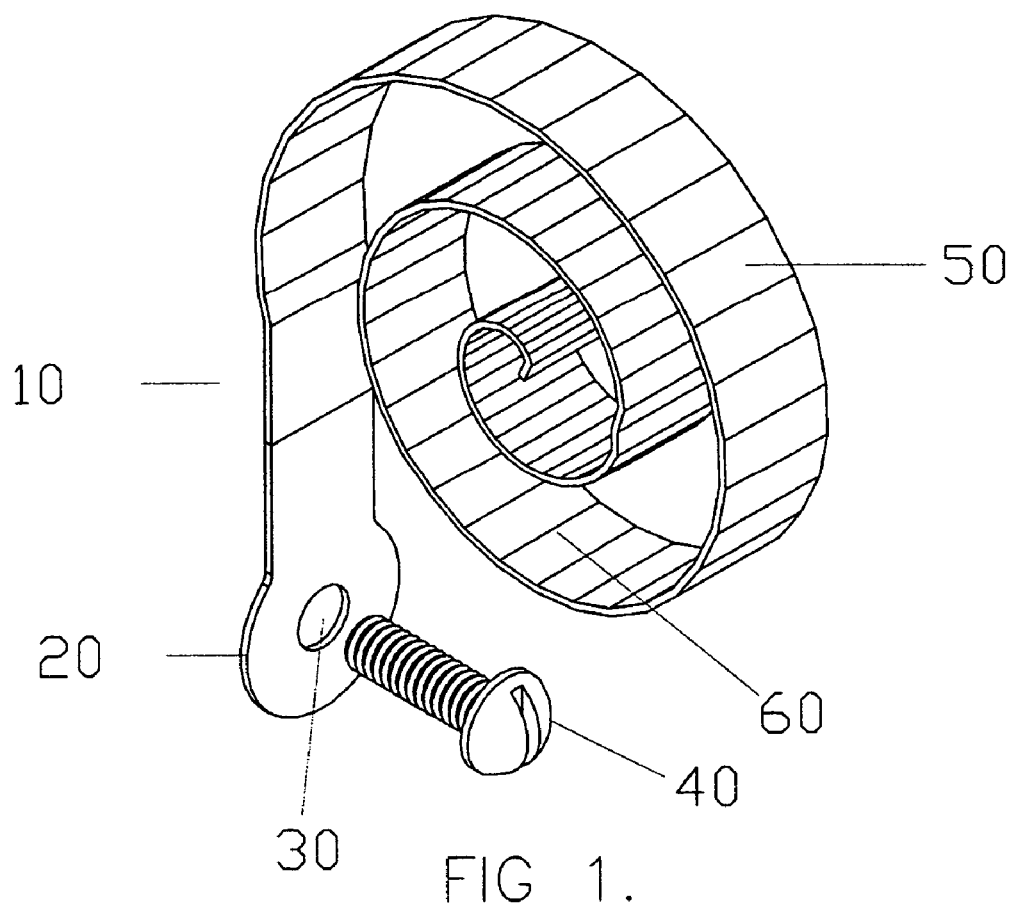
FIG. 1 Shows a tie down anchor whereby a ferrule forms a bore for receiving a securing screw.

FIG. 1 shows a tie down anchor 10 which is a single piece of material. The material has a ferrule 20 at one end which forms a bore 30. The bore 30 is formed to receive through it a securing screw 40. The securing may be accomplished with a screw or any appropriate securing means. The tie down anchor has an outer surface 50 ands an inner surface 60 which forms the receiving area for the tie down.

Figure 2:
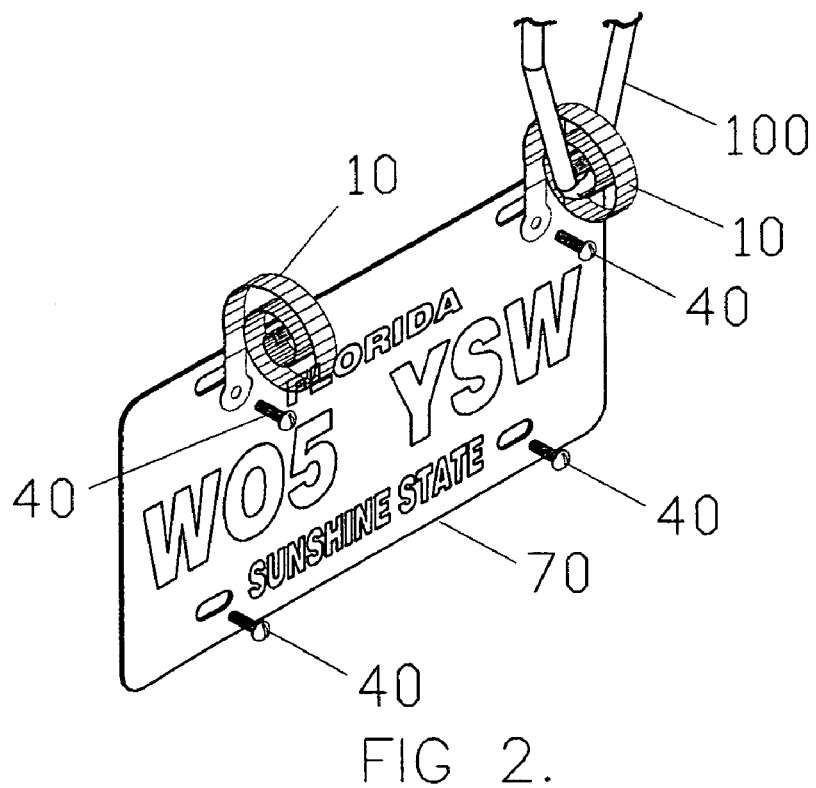
FIG. 2 Shows each of two tie down anchors positioned to be secured contemporaneously with a vehicle license tag with a single screw or other securing means used to secure both tie down anchor and license tag.

FIG. 2 shows the attachment of tie down anchor 10 which is secured to the vehicle contemporaneously with a license tag 70 by securing screws 40. The figure also shows the positioning of a tie down 100 through the tie down anchor 10.

Figures 3, 4:
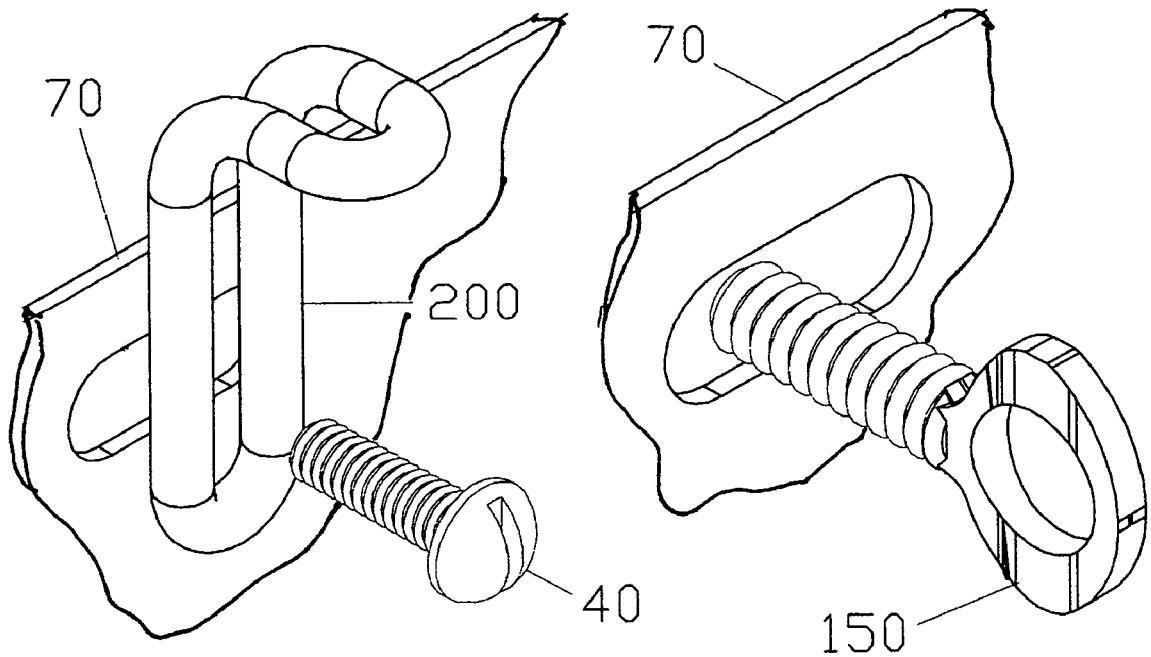
FIG. 3 shows another embodiment whereby the single piece has a shape different from that of FIG. 1.
FIG. 4 shows the tie down anchor as a single manufactured piece incorporating a threaded portion such that the threaded portion of the tie down serves the dual function of both securing the license tag and the tie down anchor to the vehicle.

FIG. 3 shows another embodiment in which tie down anchor 200 is a single piece of material and is secured to the vehicle contemporaneously with a license tag 70 by securing screws 40.

FIG. 4 shows another embodiment in which tie down anchor 150 is a single piece of material and is secured to the vehicle contemporaneously with a license tag 70 by a threaded portion which is incorporated into the body of the single piece tie down anchor 150. In this embodiment, the license tag screws are removed and the license tag is secured into place with the threaded screw portion of the tie down anchor. Once the license tag is secured into the place, the tie down anchor provides a suitable opening through which a tie down may be received.

Figure 5:
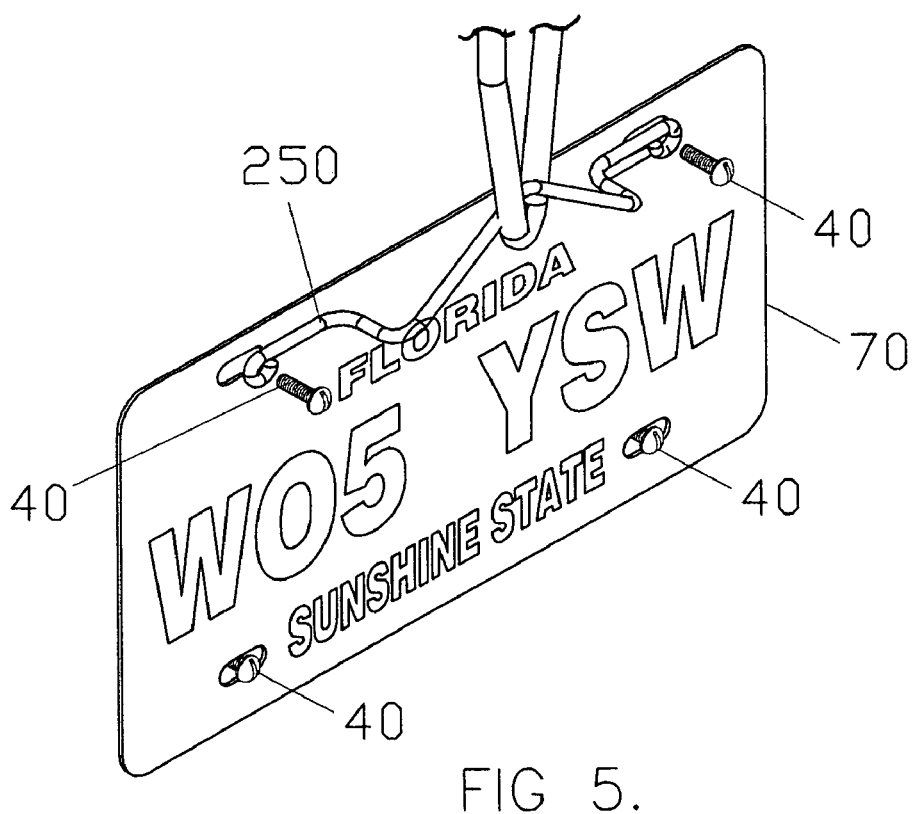
FIG. 5 Shows the tie down anchor as a single piece elongated along the length of the license plate whereby the single piece is secured contemporaneously with a vehicle license tag with a single screw or other securing means used to secure both tie down anchor and license tag.

FIG. 5 shows another embodiment in which the tie down anchor 250 is a single piece of material and is secured to the vehicle contemporaneously with a license tag 70 by securing screws 40. In this embodiment the tie down anchor 250 is still a single piece of material, and is elongated along the length of the license tag 70.

Figure 6:
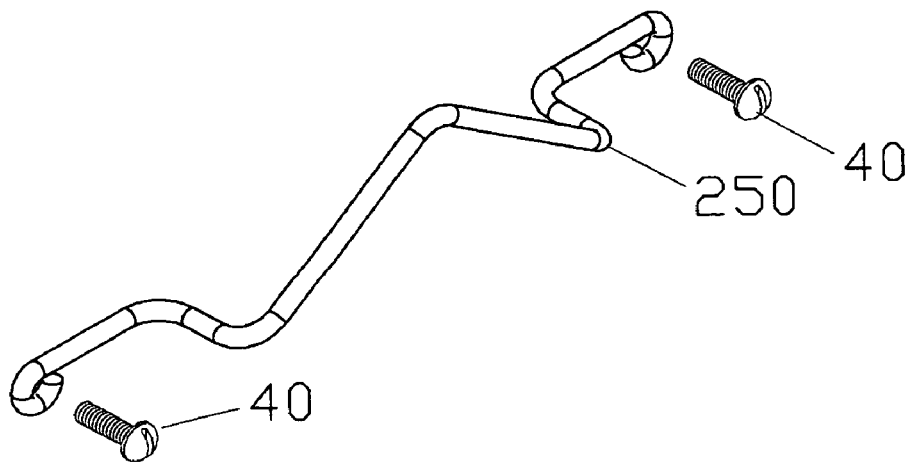
FIG. 6 shows the tie down anchor as a single piece which is elongated and extends along the length of the license plate whereby the single piece is secured contemporaneously with a vehicle license tag with a single screw on each end used to secure both tie down anchor and license tag.

FIG. 6 shows another view of tie down anchor 250 which is a single piece of material and is secured to the vehicle contemporaneously with securing screws 40.

Figure 7:
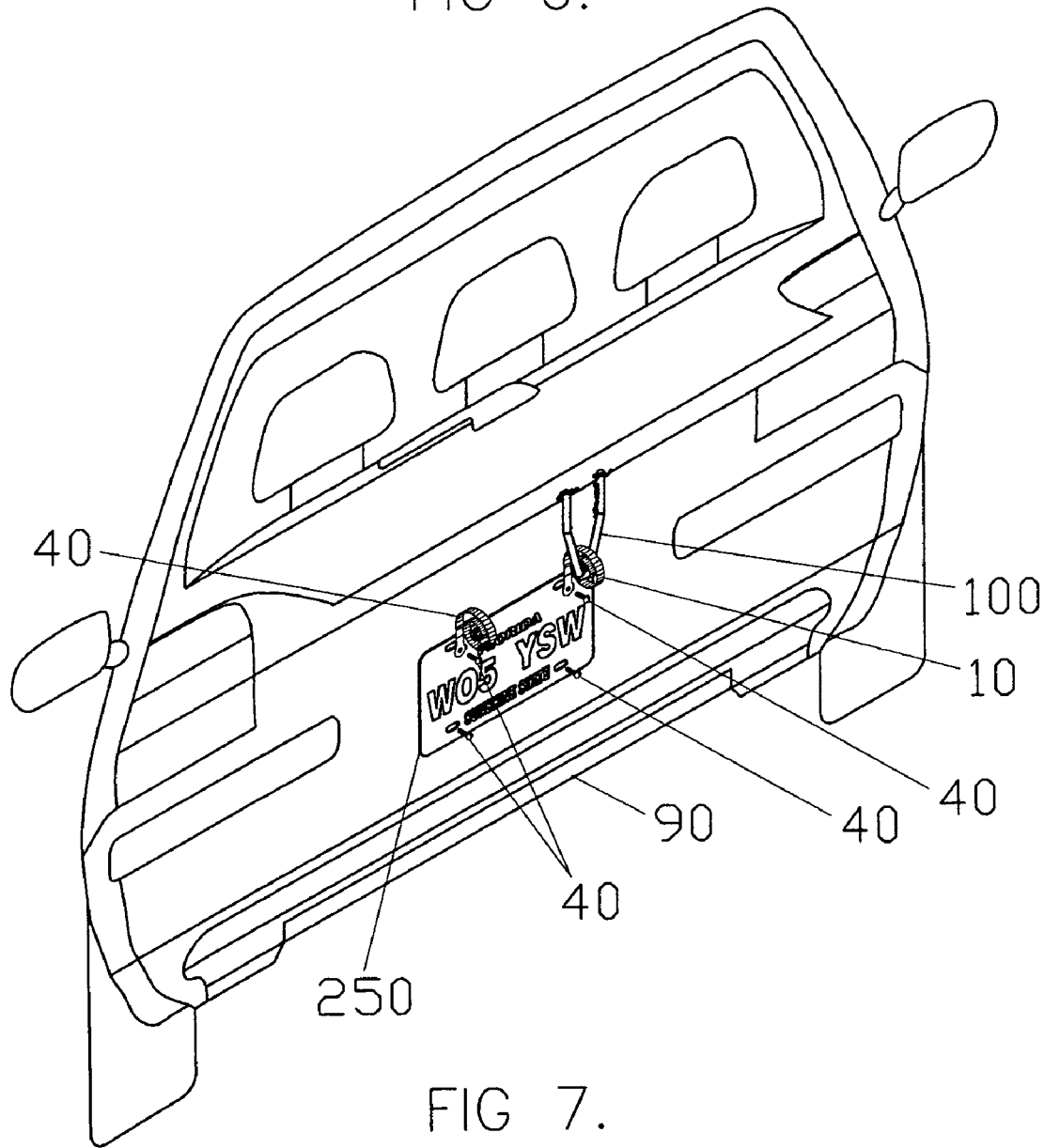
FIG. 7 further shows the embodiment from FIG. 2 from a perspective by which one can see the entire rear of a vehicle.

FIG. 7 shows the rear of a vehicle with tie down anchor 10 which is secured to the vehicle contemporaneously with a license tag by securing screws 40. The figure also shows the positioning of a tie down 100 through the tie down anchor 10. This figure shows the tie down anchor being in a more readily accessible location than the bumper 90 of the vehicle.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A tie down anchor comprising:
   (a) a single, rigid, manufactured piece, wherein said piece is formed of a plurality of contiguous, planer segments from a single sheet stock such that horizontal upper and lower surfaces of said segments each have an edge in a common plane with an adjacent one of said segments such that their juxtaposition form a flat coil; and
   (b) a curved portion formed centrally within said coil for receiving a tie down.

2. The tie down anchor of claim 1 wherein said single, rigid, manufactured piece is made of metal.

3. The tie down anchor of claim 1 further comprising a ferrule forming a bore for receiving an anchoring screw.

4. The tie down anchor of claim 1 wherein said single, rigid, manufactured piece is made of plastic.

* * * * *